Oct. 25, 1966  K. RÄNTSCH  3,280,693
SCALE READING APPARATUS
Filed Nov. 30, 1962  3 Sheets-Sheet 2

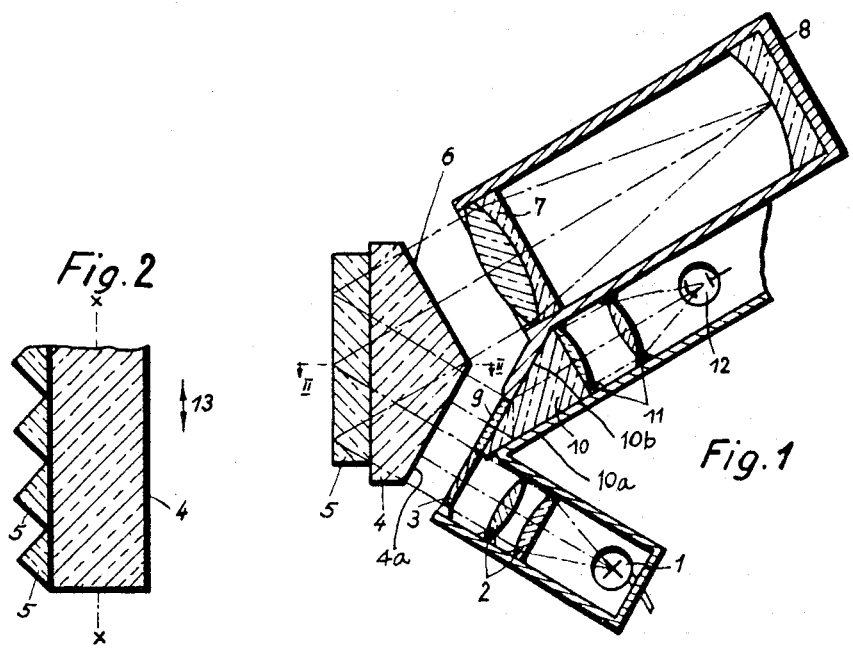
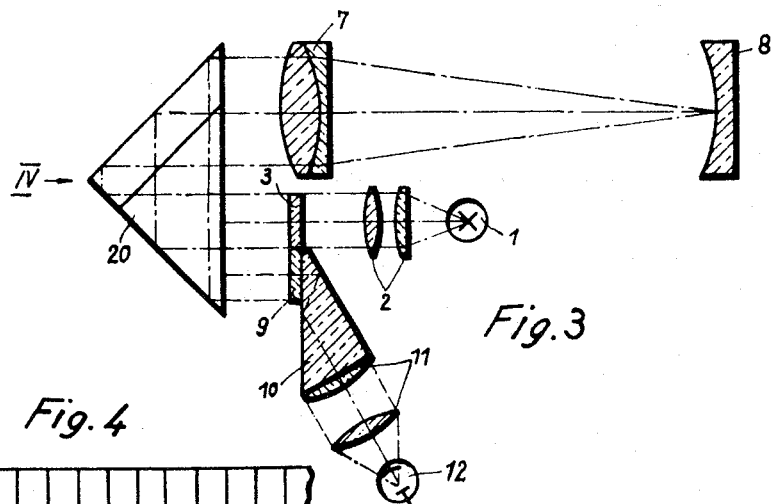
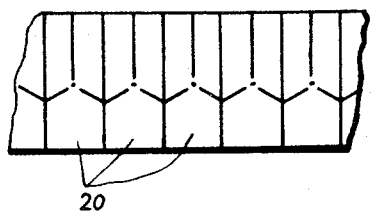

INVENTOR
KURT RÄNTSCH
BY Toulmin & Toulmin
ATTORNEYS

Oct. 25, 1966  K. RÄNTSCH  3,280,693
SCALE READING APPARATUS

Filed Nov. 30, 1962  3 Sheets-Sheet 3

INVENTOR
KURT RÄNTSCH
BY Toulmin & Toulmin
ATTORNEYS

United States Patent Office 3,280,693
Patented Oct. 25, 1966

3,280,693
SCALE READING APPARATUS
Kurt Räntsch, Wetzlar (Lahn), Germany, assignor to M. Hensoldt und Sohne, Optische Werke Aktiengesellschaft, Wetzlar (Lahn), Germany
Filed Nov. 30, 1962, Ser. No. 241,393
Claims priority, application Germany, Dec. 4, 1961, H 44,311
8 Claims. (Cl. 88—14)

The present invention relates to the detection, measuring and indication of the relative displacement between two elements, one of which is to carry a novel scale while the other element carries a novel reading device for the scale.

For the purpose of describing and claiming the invention, the element with the scale will be called displaceable, whereas the components pertaining to the reading device, or most components thereof, will be considered as being stationary. It is understood, however, that this is for the purpose of convenience only and refers merely to the relative positional relationship between the various parts. No change is required to practice the invention in with the scale stationary relative to the reader, and the reading device being displaceable, since this arrangement is only an inversion.

It is known in the art to optically and/or photoelectrically scan a scale for reading whereby the accuracy of reading depends on how finely divided the scale has been made.

Reading devices are known to visually bridge the gap between the images of two scale strokes, so as to interpolate the interval between the two strokes thereby enabling the scale reader to read finer values as directly ascertainable from the divided scale itself. Such a device is not suitable for photoelectric reading, since one usually has to "zero in" the scale. While this is possible by means of photoelectric means with follow-up control, the cost of such additional equipment is usually large.

It is the object of the present invention to provide for a scale reading device in which the accuracy of reading does not depend on how finely the scale is divided, but where a graticule is used to bridge the scale division intervals to permit easy photoelectric reading without automatic zeroing in.

The object of the invention is attained by means of a novel scale cooperating with a novel reading device for such scale.

The basic elements employed are a displaceable scale member constituted by at least one plurality of parallel mirror surfaces, equidistantly spaced apart along and inclined to the direction of scale displacement. Preferably, similar shaped prisms are employed, mounted on a scale body or being linked together otherwise to constitute a uniform structure. There is also provided a stationary grating and a stationary light pattern producing means reproducing a light pattern from the grating either upon itself, or the light pattern from a second grating is reproduced upon the first mentioned grating. The light path for producing the grating light pattern includes a mirror surface or surfaces of the scale member as described above. The division strokes or image strokes of the graticules are orientated to extend perpendicular to the direction of scale displacement as well as to the direction of light pattern movement occurring when said scale member is displaced as stated.

In the preferred embodiment, a light ray path is defined between a grating and the mirrors of the scale member to direct the light onto a stationary mirror.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIG. 1 illustrates a cross-sectional view through a first embodiment of the invention;

FIG. 2 is a sectional elevation along line II of FIG. 1 taken through a scale member employed in the first embodiment;

FIG. 3 illustrates another embodiment of the invention having similar stationary elements but at a modified mutual orientation as compared with FIG. 1 and using a different type scale member shown in side elevation;

FIG. 4 illustrates a view of this scale member in the direction of IV indicated in FIG. 3;

Figure 5:
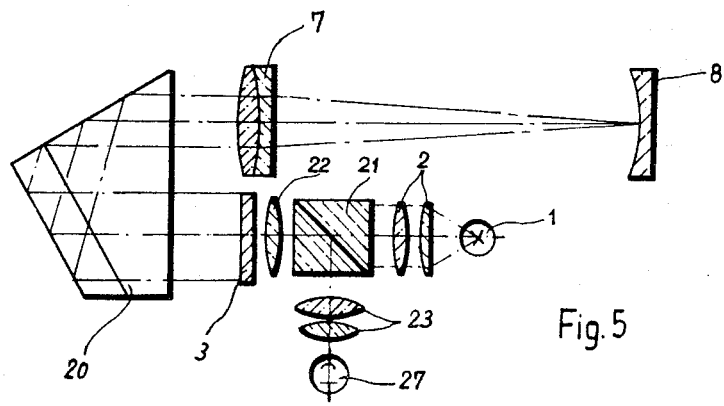
FIG. 5 illustrates schematically the optical elements of another embodiment of the invention using but one grating and a triple mirror scale member.

Turning first to FIGS. 1 and 2, there is shown a light source 1 disposed in a suitable housing together with light collimating means in the form of a condenser 2 for illuminating a graticule 3 having an optical grating therein. The lines representing the grating of the graticule are orientated in a direction perpendicular to the axis of condenser 2, but they extend parallel to the plane of the drawing. Light from graticule 3 enters a glass plate 4 through a surface 4a being parallel to the plane of extension of graticule 3, both planes are extending perpendicular to the plane of FIG. 1.

Glass plate 4 supports a plurality of similar, equidistantly spaced, rectangular prisms 5 (see FIG. 2) defining a scale member. The prism surfaces reflect the light entering through surface 4a towards exit surface 6 of plate 4 and into a telecentric imaging optical arrangement 7, 8. Total reflection occurs at each of the surfaces of prisms 5. One prism will usually be effective for such reflection, though this is not mandatory. The imaging arrangement comprises a collector lens 7 having at its focal point a concave mirror 8. Optical elements 7 and 8 produce an image at the ratio 1:1, so that the rays are directed anew onto prisms 5, and a light pattern from graticule 3 is produced on an intercepting, target graticule 9.

The plane of graticule 9 (including the light pattern from its grating) is reproduced on a photoelectric receiver 12 by means of a prism 10 and lenses 11. The ray path is shown in FIG. 1 and one can see that surface portion 10a of prism 10 also serves as reflector towards surface portion 10b for directing the light towards lenses 11.

Glass plate 4 can be shifted in directions perpendicular to the plane of the drawing of FIG. 1 which are directions as indicated by double arrow 13 of FIG. 2. Upon shifting plate 4 in these directions, the light pattern from stationary graticule 3 travels across target graticule 9 and the photoelectric receiver registers light pulses.

Graticules 3 and 9 can also be described as graticule means, wherein a portion of the graticule means is imaged upon another portion thereof.

The double reflection at prisms 5 causes the traveling speed of the light pattern from graticule 3 to be the four times amount of the speed of plate 4. Thus, if graticules 3 and 9 have similar grating constants, with adjacent marker or grating lines having a distance of 4μ, the photoelectric receiver 12 and the electric detector circuit (not shown—conventional) connected thereto detect shifting distances of plate 4 at the order of magnitude of 1μ. In other words, with a grating constant of 4μ, the photoelectric receiver 12 will register one pulse, when scale member 4, 5 is shifted by 1μ.

If the scale member 4, 5 tilts around axis x—x (FIG. 2), the light pattern from graticule 3 will be deflected in the direction of extension of the grid line markers or strokes of the graticule which is a direction extending in the plane of the drawing of FIG. 1 (or parallel thereto). Such deflection has to be avoided. This disadvantage is remedied in the improved device shown in FIGS. 3 and 4.

The embodiment shown in FIGS. 3 and 4 does not have simple rectangular prisms such as 5 of FIGS. 1 and 2, but has triple mirrors 20. The mirrors 20 are composed of prisms which are shown as being directly interconnected, so that no plate such as 4 in FIG. 1 is needed as a common support but, of course, such a plate can also be used. The general optical properties of the arrangement have not been altered by the omission of plate 4. However, the mutual arrangement of the general optical paths differs from that in FIG. 1.

Condenser 2 and graticule 3 emit light in a direction perpendicular to the plane of extension of mirrors 20 which plane is perpendicular to that of the drawing. Thus, the path of the entering light is parallel to the path of the light doubly reflected in any of the triple mirrors. This, however, has altered only the orientation of the optical axis of 7, 8 to the axis of condenser 2, as compared with FIG. 1. It can be seen from FIG. 3, that a rotary movement of mirrors 20, in the plane of the drawing of FIG. 3, does not alter the parallelism of the rays between elements 3 and 20, and between elements 20 and 7, nor does such rotary movement cause a shifting of the graticule image perpendicularly to the longitudinal movement of mirror assembly 20 constituting the scale member. The further advantage of employing triple mirrors rather than rectangular prisms can also be seen in that in the former, only the distance from peak to peak has to be accurate and uniform, whereas in case of prisms corresponding flank surfaces of neighboring prisms have to be strictly parallel.

Proceeding now to FIG. 5, elements 1, 2, 3, 7 and 8 correspond to those explained above, and their mutual orientation follows that shown in FIG. 4. However, in FIG. 5 there is interposed, between condenser 2 and graticule 3 a beam splitting prism or cube 21 having a semitransparent inner mirror surface. There is a further condenser lens 22, and the returning light is deflected by the semitransparent surface of prism 21 towards photoelectric receiver 27. Lenses 22 and 23 produce an image of the returning light into photoelectric receiver 27.

In this embodiment, graticule 3 serves as a light pattern producing object as well as a target graticule. The mirror system 20 is symmetrical in this embodiment but incoming and outgoing rays are still parallel. Again, any tilting of mirrors 20 around an axis perpendicular to the plane of the drawing has no effect on the parallelism of the rays at graticule 3 and optical members 7, 8.

Figure 6:
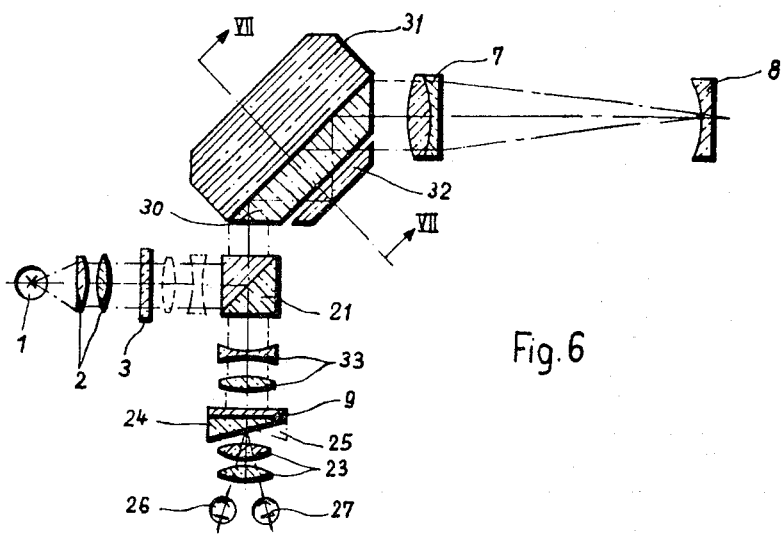
FIG. 6 illustrates schematically the optical elements of another embodiment of the invention wherein the scanning or grating light pattern is returned several times onto the specific scale member employed.
Figure 7:
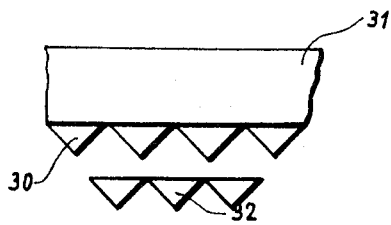
FIG. 7 illustrates a cross-sectional view through the scale member used in the embodiment of FIG. 6 the section being taken along line VII therein.

Proceeding now to FIGS. 6 and 7 the elements 1, 2, 3, 21 correspond to those designated with like reference numerals referred to in the previous description of the figures, and again there is also a telecentric optical arrangement 7 and 8, but having its optical axis arranged parallel to that of condenser lenses 2. There is provided a glass element 31 having the configuration of a rack with "teeth" 30 constituted by prisms and being otherwise similar to scale member 4, 5 of FIGS. 1 and 2. In this embodiment, the light is reflected at the outer surfaces of the prism "teeth" 30 which thus define a plurality of pairs of mutually inclined reflecting mirrors. In FIG. 6, however, it is shown that the semitransparent mirror surface of prism 21 deflects the light pattern coming from graticule 3 at right angles, towards the "teeth" 30 of "rack" 31. "Rack" 31 is movable perpendicularly to the plane of the drawing of FIG. 1.

There is further provided a series of stationary, but optically position-adjustable series of rectangular prisms 32 (see FIG. 7) receiving the light pattern from prism —"teeth" 30 after a first reflection therein. Stationary prisms 32 return the light pattern to the rack teeth for a second reflection therein. Thereafter the light pattern is received by optical members 7, 8, returning the same way through elements 30–32–30 and straight through prism 21.

The double reflection of the light pattern in prism 30 both when traveling to as well as from optical members 7, 8 causes the light pattern from graticule 3 to move at a speed eight-fold that of traveling rack 31. Of course, an image producing ratio of 1:1 of optical means 7, 8 is again assumed.

Between prism 21 and target graticule 9, there is interposed an image enlarging lens 33 so that the graticule 9 can have a more coarse grating than has graticule 3, at the ratio of the magnification produced by lenses 23.

If graticle 3 is, relatively speaking, coarsely grated at 8μ, one still can register a 1μ shift of rack 31 due to the eight-fold speed transmission as described.

Graticule 9 actually is biparted with the center plane running perpendicularly to both the extension of graticule 9 and the plane of the drawing. The two grated sections are staggered by half the distance between adjacent strokes. Immediately preceding the exit side of graticule 9, there are two wedge shaped prisms 24 and 25 arranged so that two photoelectric detectors 26 and 27 receive light, phase shifted by the two graticule sections so that light pulses can be counted when rack 31 moves in either direction, and proper directional differentiation can be had. Actually, prism 24 and photoelectric detector 26 are somewhat above the plane of the drawing, while wedge prism 25 and detector 27 are somewhat below thereof.

For reasons of economically manufacturing the elements employed, it is of advantage to have the graticules 3 and 9 made with similar gratings. Thus, one will use a graticule 3 as coarse as is graticule 9 (grating constant more than 8μ, but there is an image magnification reducing lens disposed immediately following graticule 3 (not designated, dashed elements between graticule 3 and prism 21). This latter lens reduces the size of the light pattern from the grating of graticule 3 at the same rate as lens 33 enlarges it. The basic design and mode of operation is not affected therefrom.

Figure 8:
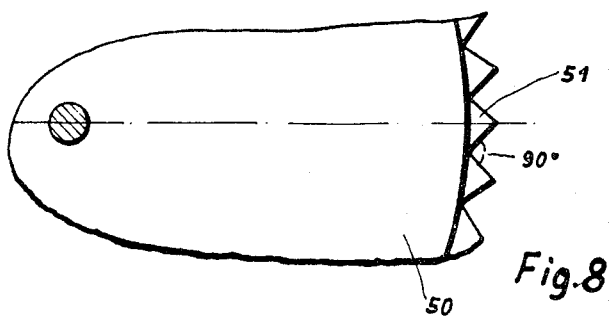
FIG. 8 illustrates schematically the adaption of the invention to a rotary scale member.

FIG. 8 illustrates the adaption of the inventive concept to rotary scale movements. In lieu of the glass bars, etc., as described with reference to the previous figures, there is provided a rotatable element 50 having circumferentially disposed thereon a plurality of prisms 51 in such a manner that the surfaces of neighboring prisms are inclined by 90°. Here, the outer surfaces of the prisms operate as reflecting surface. The arrangement can be substituted for the elements 4, 5 in FIG. 1 in such a manner, that the axis of rotation is in the plane of drawing of FIG. 1 (perpendicular to that of FIG. 8).

Figure 9:
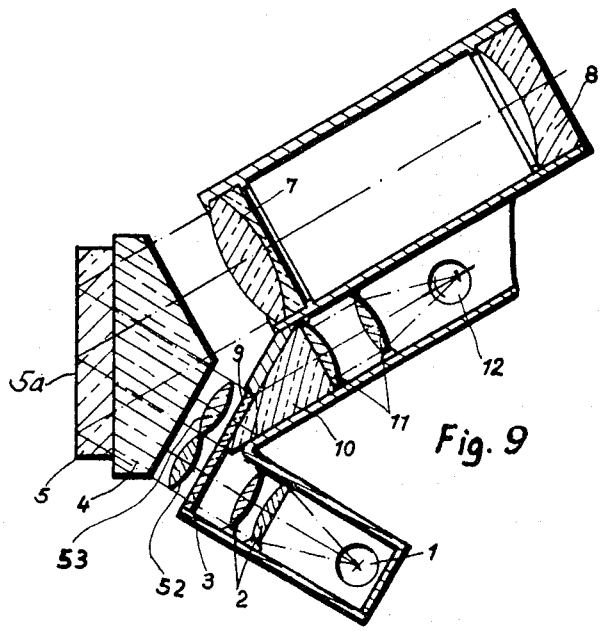
FIG. 9 illustrates an embodiment similar to that of FIG. 1 with additional imaging means.

FIG. 9 illustrates an inventive embodiment resembling closely that of FIG. 1. This is particularly true with regard to elements 1 through 12. However, there is provided a first objective 52 between graticule 3 and glass plate 4 imaging the graticule 3 directly upon the apex or roof edge 5a of a prism 5. The telecentric optical arrangement 7 and 8 is disposed so that the light pattern from graticule 3 on prism edge 5a is reproduced again on this apex edge, but laterally displaced from the first light pattern. A second objective 53 is interposed between plate 4 and graticule 9 to project the last-mentioned light pattern on apex edge 5a onto graticule 9.

The advantage of this particular arrangement is that the prisms 5 do not have to have very accurately machined angles respectively between two inclined surfaces.

The arrangements as described thus far can preferably be used to count pulses. For example, upon movement of any of the scales (4, 20, 31, 40, 50), the light modulations detected by any of the photoelectric detectors employed are counted in a conventional counting device connected thereto.

The invention is not limited to the embodiments described above but all changes and modifications thereof not constituting departments from the spirit and scope of the invention are intended to be covered by the following claims.

What is claimed is:

1. In an apparatus for the measurement of the displacement of an object displaceable in a predetermined direction, a scale on said displaceable object and having a series of intersecting reflecting surfaces with the lines of intersection arranged normally to said direction with successive reflecting surfaces being at right angles to each other, first and second stationary optical gratings having lines normal to said direction, a first optical system including a light source and light collimating means and passing a collimated beam of light through said first optical grating to project a light pattern from said first grating onto one of said reflecting surfaces and then onto an adjoining reflecting surface, a second optical system including collector lens and a curved reflecting surface receiving the light pattern of said first grating reflected from said adjoining reflecting surface to reflect said light pattern back onto said scale reflecting surfaces and onto said second stationary optical grating, the reflected light pattern of said first grating on said second grating being displaced as a function of the displacement of said object, and a photoelectric pulse counter receiving the pulses of the reflected light pattern of said first grating moving across said second grating during the displacement of the object to detect the displacement of the object.

2. In an apparatus as claimed in claim 1 wherein said scale comprises a glass element having a series of similar equidistantly spaced triangular prisms thereon, a stationary series of similar equidistantly spaced triangular prisms with two faces of said prisms being at right angles, the lines of intersection of said right angle faces being parallel to the lines of intersection of said first mentioned series of prisms, said stationary series of prisms being adjacent said scale series of prisms to receive said light pattern after a first reflection in said scale series of prisms and reflect said light pattern back to said scale series of prisms for a second reflection therein.

3. In an apparatus as claimed in claim 1 wherein said reflecting surfaces are similar and are equidistantly spaced on said scale.

4. In an apparatus as claimed in claim 1 wherein said series of reflecting surfaces comprises a series of similar equidistantly spaced triangular prisms with two faces of a prism being at right angles.

5. In an apparatus as claimed in claim 4 wherein said scale comprises a glass member having three faces with said prisms being mounted on one of said faces, a second of said faces being perpendicular to the light path of said first optical system and a third of said faces being perpendicular to the light path of said second optical system.

6. In an apparatus as claimed in claim 4 wherein said prisms are spaced apart at a distance which is an integral plurality of a grating constant of said first grating.

7. In an apparatus as claimed in claim 1 and further comprising stationary beam splitter means reflecting the light pattern from said first grating into at least one of said reflecting surfaces, said second grating being so positioned that the image of said first grating reflected by said second optical system and a pair of reflecting surfaces passes through said beam splitter means onto said second grating.

8. In an apparatus as claimed in claim 7 and further comprising variable image magnification means interposed between said beam splitter means and one of said gratings.

References Cited by the Examiner

UNITED STATES PATENTS

| | | | |
|---|---|---|---|
| 2,861,345 | 11/1958 | Spencer | 88—14 X |
| 3,034,709 | 5/1962 | Batori | 88—1 X |
| 3,118,069 | 1/1964 | Guillant | 88—14 X |

FOREIGN PATENTS

| | | |
|---|---|---|
| 782,831 | 9/1957 | Great Britain. |
| 870,461 | 6/1961 | Great Britain. |

JEWELL H. PEDERSEN, *Primary Examiner.*

E. S. BAUER, *Assistant Examiner.*